United States Patent
Bhatt et al.

(10) Patent No.: US 8,687,015 B2
(45) Date of Patent: Apr. 1, 2014

(54) BRUSHING TOOLS FOR DIGITAL IMAGE ADJUSTMENTS

(75) Inventors: Nikhil Bhatt, Cupertino, CA (US); Mark Lee Kawano, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1112 days.

(21) Appl. No.: 12/611,001

(22) Filed: Nov. 2, 2009

(65) Prior Publication Data
US 2011/0102457 A1    May 5, 2011

(51) Int. Cl.
   G09G 5/02    (2006.01)
(52) U.S. Cl.
   USPC ........... 345/594; 345/589; 345/593; 345/619; 382/311
(58) Field of Classification Search
   None
   See application file for complete search history.

(56) References Cited

U.S. PATENT DOCUMENTS

| | | |
|---|---|---|
| 6,300,955 B1 | 10/2001 | Zamir |
| 7,593,603 B1 | 9/2009 | Wilensky |
| 7,602,949 B2 | 10/2009 | Simon et al. |
| 2007/0188510 A1 | 8/2007 | Kokemohr |
| 2008/0075395 A1 | 3/2008 | Wallace et al. |

OTHER PUBLICATIONS

"Using Adobe Photoshop Lightroom 2" Sep. 20, 2008 Accessed via web, http://web.archive.org/web/20080920195432/http://help.adobe.com/en_US/Lightroom/2.0/lightroom_2_help.pdf on Nov. 20, 2012.*
Dayton et al., "The Photoshop 5/5.5 Wow! Book, Windows/Mac Edition," Peachpit Press, Copyright 2000.pp. 1, 60, 80, 185.*
Al Ayyat, Soumaia Ahmed. "Advanced Photoshop 5.5—The American University in Cairo Academic Computing services." Fall 2001. Accessed via the web, http://www.aucegypt.edu/it/uact/training/documents/advphotoshop.pdf on Jun. 13, 2013.*
Non-Final Office Action for U.S. Appl. No. 13/664,009, issued on Jan. 23, 2013, 14 pages.

* cited by examiner

*Primary Examiner* — Antonio A Caschera
(74) *Attorney, Agent, or Firm* — Fish & Richardson P.C.

(57) ABSTRACT

Among other things, methods, systems and computer program products for applying an image adjustment to an image. A choice of image adjustments is presented to a user of a data processing device. A user selection is received from among the choice of image adjustments at least one image adjustment that a user desires to apply to an area of interest of the image. The user selected image adjustment is applied to an entirety of an image. A preview of the user selected image adjustment applied to the entirety of the image is displayed. Also, user input comprising user selection of a brushing application is received. The user selected image adjustment is applied to the area of interest of the image and a remainder of the image is restored to a pre-adjustment state using the user selection of the brushing application.

28 Claims, 15 Drawing Sheets

BRUSHING TOOLS FOR DIGITAL IMAGE ADJUSTMENTS

BACKGROUND

This application relates to adjusting digital image.

Digital images can be modified using an image editor, for example, to improve the contrast of an image when the image appears dull or flat. Also, the image editor can apply tinting or add a vignette to an image. To modify the digital image, a user typically selects a desired image adjustment to modify the entire image using the selected image adjustment. Also, the image editor may include a brush for applying an image adjustment. A brush represents a drawing tool in computer graphics. When editing a digital image, a brush can be used to change the color of desired pixels on the digital image. For example, a brush can be represented using a predefined shape, and the pixels on the graphics document covered by the shape of the brush can be affected with a desired image adjustment. Typically, the user selects an image adjustment and manually loads the brush with the selected image adjustment before being able to apply the image adjustment.

SUMMARY

Methods, systems and computer program products are described for implementing a brushing tool for user selected image adjustments.

In one aspect, a method can include presenting a choice of image adjustments to a user of a data processing device. The method can include receiving, at the data processing device, a user selection from among the choice of image adjustments at least one image adjustment that a user desires to apply to an area of interest of the image. The method can include applying, at the data processing device, the user selected image adjustment to an entirety of an image. The method can include displaying, at the data processing device, a preview of the user selected image adjustment applied to the entirety of the image. The method can include receiving, at the data processing device, user input comprising user selection of a brushing application. Also, the method can include applying, at the data processing device, the user selected image adjustment to the area of interest of the image and restoring a remainder of the image to a pre-adjustment state using the user selection of the brushing application.

Implementations can optionally include one or more of the following features. The selected brushing application can include a brush-in application configured to apply the user selected image adjustment to the area of interest of the image. Implementing the brush-in application can include removing the pre-applied image adjustment from the entirety of the image to restore the image to a pre-adjustment state; loading a brush with the selected image adjustment; and applying the user selected image adjustment onto the area of interest of the image based on the user input that comprises an indication of a brush stroke. The selected brushing application can include a brush-away application configured to remove the selected image adjustment from the image. Implementing the brush-away application can include using a brush to remove the pre-applied image adjustment from the image except for the area of interest of the image based on the user input that comprises an indication of a brush stroke. Applying the user selected image adjustment can include applying a brush mask over the area of interest of the image. The choice of image adjustments can include at least one of skin smoothing, blurring, saturation, color, lighten or darken, devignette, white balance, exposure, enhance, chromatic aberration, noise reduction, curves, highlight and shadows, black and white, color monochrome, sepia tone, sharpen, edge sharpen and vignette. The method can include detecting an edge of the area of interest of the image; and controlling application of the selected image adjustment based on the detected edge. The method can include identifying one or more areas of shadows, midtones or highlights on the image; and controlling application of the user selected image adjustment based on the identified areas of shadows, midtones or highlights per brush stroke. The method can include receiving user modification of a strength of the user selected image adjustment.

In another aspect, a method can include presenting a choice of brushes preloaded with a plurality of image adjustments to a user of a data processing device. The method can include receiving, at the data processing device, a user selection of at least one of the brushes preloaded with image adjustments to apply to an area of interest of the image. The method can include receiving, at the data processing device, user input comprising an indication of the area of interest to apply the user selected at least one brush preloaded with a corresponding image adjustment. Also, the method can include applying, at the data processing device, the corresponding image adjustment to the indicated area of interest of an image using the user selected preloaded brush based on the user input.

Implementations can optionally include one or more of the following features. The user selected preloaded brush can include an adjustable cursor area that includes an inner area and an outer area to apply the selected image adjustment to pixels covered within the cursor area, wherein the inner area represents a maximum effect of the user selected image adjustment and the outer area represent a minimum effect. The choice of brushes can be preloaded with image adjustments that include at least one of skin smoothing, blurring, saturation, color, lighten or darken. The method can include detecting an edge of the area of interest of the image. The image can include controlling application of the image adjustment corresponding to the user selected preloaded brush onto the area of interest of the image based on the detected edge. The method can include identifying one or more areas of shadows, midtones or highlights on the image; and controlling application of the image adjustment corresponding to the user selected preloaded brush based on the identified one or more areas of shadows, midtones or highlights per brush stroke. The method can include receiving user input modifying a strength of the image adjustment corresponding to the user selected preloaded brush.

In another aspect, a method can include receiving, at a data processing device, a user request to apply an image adjustment to an area of an image using one or more brush strokes. The method can include applying, at the data processing, the requested image adjustment to the area of the image. The method can include displaying, at the data processing, a visual indication identifying the area of the image applied with the image adjustment.

Implementations can optionally include one or more of the following features. The visual indication can include an overlay representing the applied image adjustment positioned over the area of the image. The overlay can include a colored layer. Displaying the visual indication can include displaying pixels of the area of the image applied with the image adjustment without displaying pixels of rest of the image. Displaying the visual indication can include displaying an overlay representing one or more brush strokes corresponding to the applied image adjustment without displaying any pixels of the image.

In another aspect, an apparatus can include an image adjustment system configured to apply an image adjustment to a target area of an image. The image adjustment system can include a graphical user interface to present available image adjustments and brushing tools. The apparatus can include a display unit in communication with the image adjustment system. The display unit can be configured to display the graphical user interface to present the available image adjustments and brushing tools to a user. The apparatus can include a user input unit to communicate with the image adjustment system and the display unit. The user input unit can be configured to receive a user selection of at least one of the available image adjustments and at least one of the available brushing tools. The image adjustment system can be configured to apply the user selected image adjustment to an entirety of the image. The display unit is configured to display a preview of the user selected image adjustment applied to the entirety of the image. The image adjustment system is configured to apply the user selected image adjustment to the target area of the image and restore a remainder of the image to a pre-adjustment state. Also, the display unit can be configured to display a result of the applied image adjustment to the target area of the image.

Implementations can optionally include one or more of the following features. The available brushing tools can include a brush-in tool configured to remove the applied image adjustment from the entirety of the image, and apply the user selected image adjustment to the target area of the image without affecting a remainder of the image. The available brushing tools can include a brush-away tool to remove the user selected image adjustment from areas of the image other than the target area. The display unit can be configured to visually indicate the target area of the image applied with the selected image adjustment. The image adjustment system can include a preview unit configured to communicate with the display unit. The preview unit can be configured to render a preview of the selected image adjustment to the entire image, and send the rendered preview to the display unit to be displayed to a user. The graphical user interface can include a user interface widget configured to modify the strength of the user selected image adjustment.

In another aspect, a computer-readable medium embodying instructions when executed by a processor causes a data processing data processing to perform various operations. Operations can include receiving a user selection of an image adjustment that a user desires to apply to an area of interest of an image. Operations can include applying the image adjustment to an entirety of the image. Operations can include previewing the image adjustment applied to the entirety of the image. Operations can include receiving a user selection of a brushing application to apply the user selected image adjustment. Operations can include receiving user input indicating one or more brush strokes of the user selected brushing application. The indicated one or more brush strokes can represent the area of interest of the image to apply the user selected image adjustment. Operation can include applying the user selected image adjustment to the area of interest of the image using the user selected brushing application and restoring a remainder of the image to a pre-adjustment state. Also, operations can include displaying a result of the applied user selected image adjustment.

Implementations can optionally include one or more of the following features. The brushing application can include a brush-in application configured to remove the applied image adjustment from the entirety of the image; load the user selected image adjustment to a brush; and apply the user selected image adjustment to the areas of interest using the brush. The brushing application can include a brush-away application to remove the user selected image adjustment from areas of the image other than the area of interest.

The subject matter described in this specification can potentially provide one or more advantages. The brush-in and brush-away applications can be used to selectively add or remove a user selected image adjustment to a user selected area on the image. The user selected image adjustment can be previewed to allow the user to obtain a desired strength of the image adjustment before applying the image adjustment to the image. Also, a set of quick brushes can be preloaded with corresponding image adjustments to allow for quick application of the various image adjustments. Because the brushes are preloaded with the image adjustments, the user can simply select one of the preloaded brushes and start brushing right away.

Additionally, various overlays can be implemented to provide visual representation of image adjustments applied to an image. For example, a colored overlay can be displayed over the area of interest to identify the area where the image adjustment was applied. Also, an overlay that illustrates the brush strokes can be displayed over the image to identify the actual brush strokes used to apply the image adjustment to the image. In this overlay, the actual pixels of the image are not displayed to the user. In another type of overlay, the image can be displayed with an overlay that shows only the pixels of the area of interest affected by the image adjustment. Remainder of the image is not displayed to the user to focus the attention of the view to the area of interest.

Also, the techniques described in this specification can be used to implement brush control using highlights/midtones/shadows. In this brush control mechanism, tonal information can be used to control the brush, per brush stroke. Each brush stroke can be controlled based on tonal information such as highlights, midtones or shadows. For example, when the user desires to darken the bright area (e.g., the sky but not the trees in a field) in an image, highlights can be used to automatically darken the bright area(s) only.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

Like reference symbols and designations in the various drawings indicate like elements.

DETAILED DESCRIPTION

Techniques, apparatus, systems and computer program product are described for implementing various brush tools for applying adjustments to an image. A brush can correspond to an adjustment for a single attribute, such as brightness. Alternatively, a brush can correspond to an adjustment for a combination of attributes. For example, a set of quick brushes can be preloaded, each corresponding to a particular adjustment, to provide "read-to-use" brush tools. Also, brush-in and brush-out tools can be used to selectively apply or remove a particular adjustment. Moreover, to display the applied adjustments, an overlay can be implemented over the image to identify the locations of the applied adjustments.

Brush-In/Brush-Out Tool

Figure 1A:
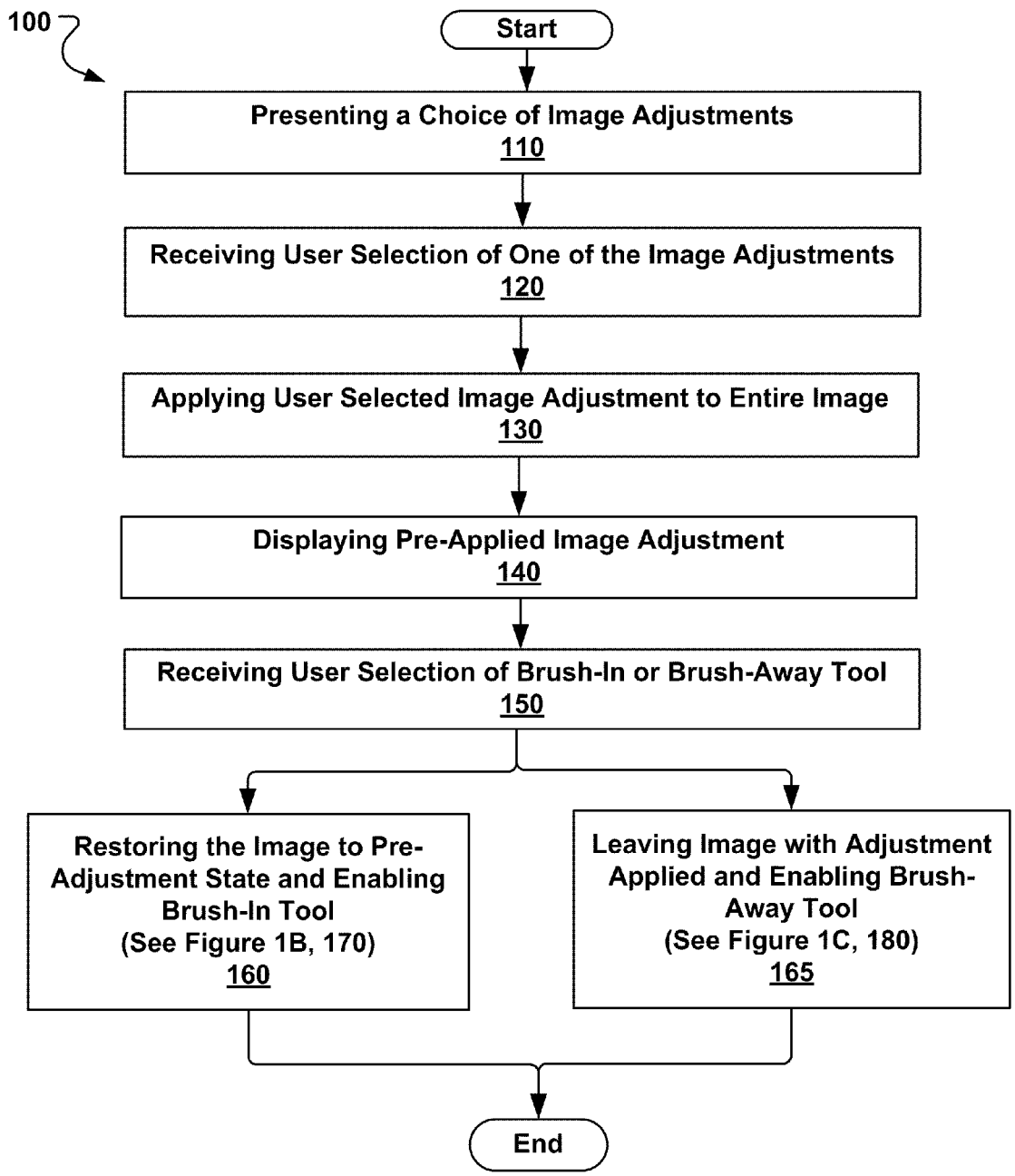
FIG. 1A is a process flow diagram showing a process for applying image adjustments to an image.

FIG. 1A is a process flow diagram showing a process (100) for applying image adjustments to an image. A system or an apparatus can implement a graphical user interface (GUI) to present a choice of image adjustments to a user (110). The image adjustments available for user selection can include skin smoothing, blurring, saturation, lighten or darken, devignette, white balance, exposure, enhance, chromatic aberration, noise reduction, curves, highlight & shadows, levels, color, black & white, color monochrome, sepia tone, sharpen, edge sharpen, and vignette. The system can receive a user selection of one of the image adjustments presented (120). The system can apply the user selected image adjustment to the entire image (130). The application of the image adjustment to the entire image is temporary and/or an intermediate step to the final output. Also, the system can display the entire image with the pre-applied image adjustment for the user to preview (140). The system can receive a user selection of a brush tool to use in applying the selected image adjustment to a target area on the image (150). The received selection can include a brush-in tool or a brush-away tool. Depending on the use selection of either the brush-in tool of the brush-away tool, the selected image adjustment can be applied to the target area in a different manner. For example, the system can restore the image to pre-adjustment state and enable the brush-in tool to apply the image adjustment to the target area of interest (160). Also, the system can leave the image with the adjustment applied and enable the brush-away tool to remove the image adjustment from areas of the image other than the target area of interest (165). The techniques for implementing the brush-in or brush-away tool are described below with respect to FIGS. 1B and 1C.

Figure 1B:
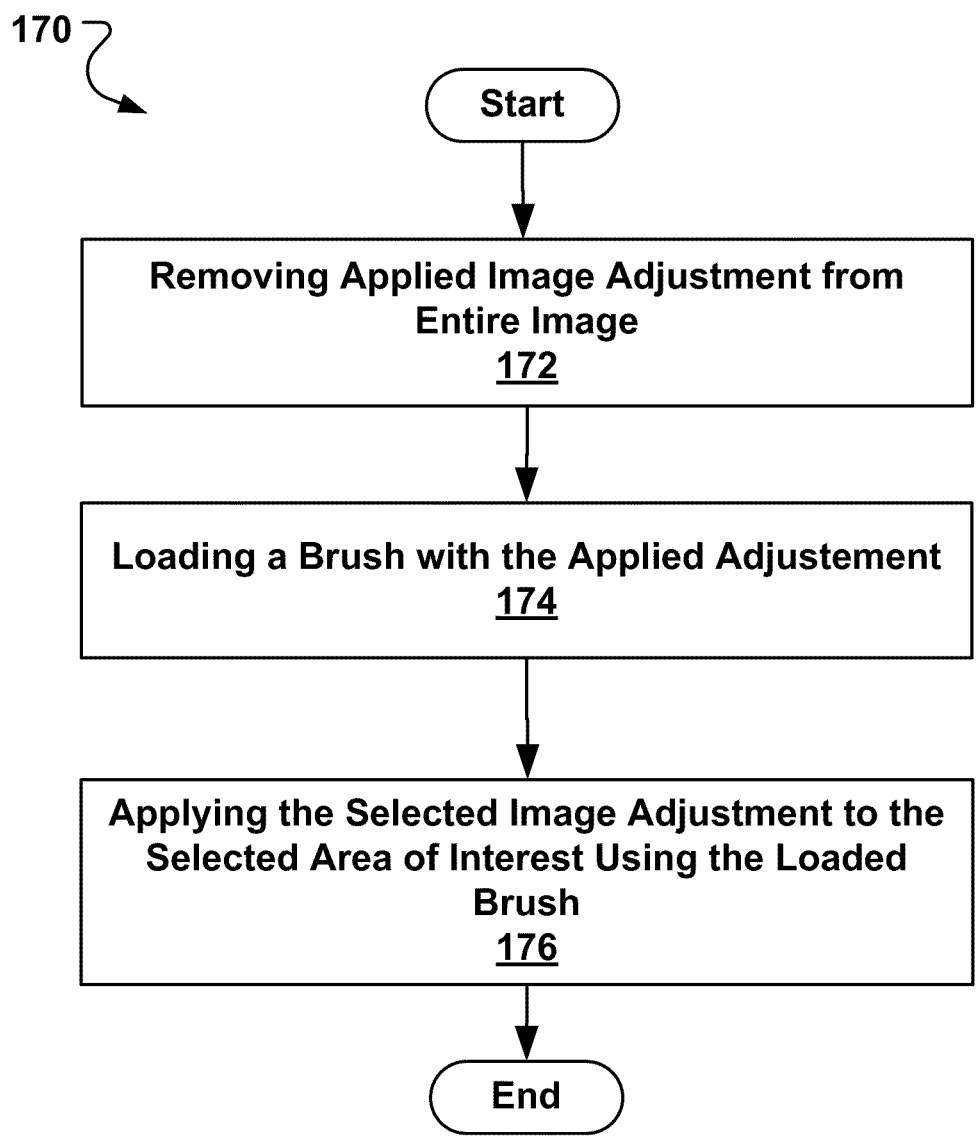
FIG. 1B is a process flow diagram showing a process for implementing a brush-in tool.

FIG. 1B is a process flow diagram showing a process (170) for implementing a brush-in tool. The system can implement the brush-in tool to apply the selected image adjustment to the target area(s) of interest on the image. As described above, the selected adjustment is initially applied to the entire image (130) and previewed to the user (140). For example, if the selected adjustment is to darken, the entire image is darkened initially. As the entire image is darkened, the user can visually observe whether the amount of darkening is sufficient to achieve the desired effect. Also, the user can focus his attention to a specific area of interest (e.g., the selected area to apply the image adjustment) on the image. For example, the area of interest may be a jacket worn by the person in the image. The user can incrementally darken the image until the area of interest has achieved a desired effect. If the area of interest has been darkened too much, the user can remove the previous increment of the darken adjustment or apply a lighten adjustment until the desired effect is achieved on the area of interest. Then the applied overall adjustment (e.g., the desired amount of darkening) is removed from the entire image (172), and the adjustment is transferred or loaded onto a brush (174). The brush loaded with the desired adjustment can be used to selectively apply the loaded adjustment to the target area(s) of interest on the image (176). The remaining areas of the image is unaffected by the brush because the brush is able to apply the adjustment to only those pixels that belong to the area of interest using edge detection, for example. Thus, except for the area of interest, the remainder of the image is restored to a pre-adjustment state. The techniques for controlling the brush, including edge detection are described further below. While applying the image adjustment using the brush-in tool, the user can decide to apply the adjustment to the entire image or remove from the entire image.

Figure 1C:
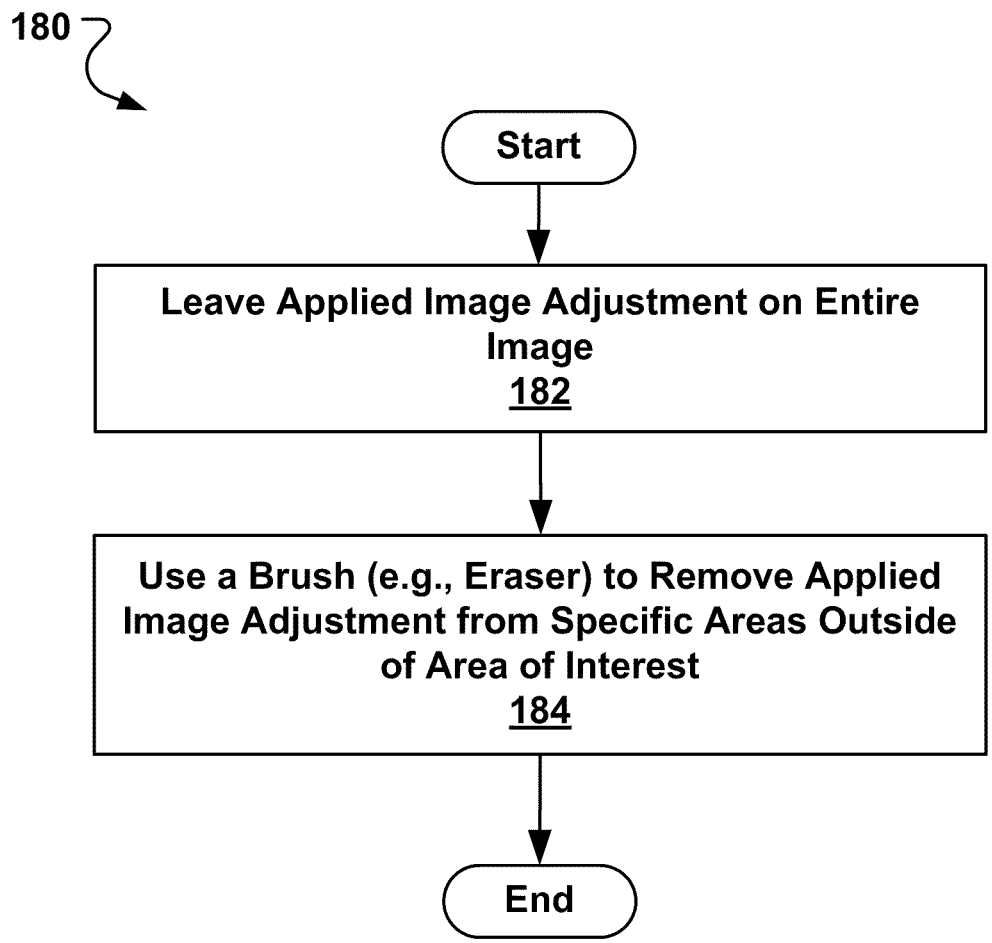
FIG. 1C is a process flow diagram showing a process for implementing a brush-away tool.

FIG. 1C is a process flow diagram showing a process (180) for implementing a brush-away tool. The brush-out too can be implemented to take away the selected image adjustment from areas outside of the target area(s) of interest. As described above, the user selected image adjustment is initially applied to the entire image (130) and previewed to the user (140). Similar to the brush-in tool, the user can incrementally apply the selected adjustment until the desired effect is achieved (e.g., the desired amount of adjustment). Once the desired amount of adjustment is applied to the entire image, the applied adjustment is left on the entire image (182). Then the brush away tool can be used to remove the applied adjustment from specific areas of the image, leaving the image adjustment on the target area(s) of interest (184). By removing the image adjustment from the remainder of the image other than the area of interest, the remainder of the image is restored to a pre-adjustment state. The brush-away tool to remove the adjustment can be implemented as an eraser, for example. While applying the image adjustment using the brush-away tool, the user can decide to put back the adjustment to the entire image or remove from the entire image.

Quick Brush Tool

In addition to the brush-in and brush-away tools, the system can present a set of quick brushes, each pre-loaded with a corresponding image adjustment. For example, a quick brush can be preloaded with adjustments including at least one of skin smoothing, dodge (lighten), burn (darken), polarize (multiply), intensify contrast (overlay), tint, contrast, saturation, definition, vibrancy, blur, sharpen, halo reduction, and noise reduction. Because the quick brushes are already pre-loaded with a corresponding image adjustment, the user can quickly apply the desired image adjustment or combination of adjustments without having to select and load an adjustment to a brush.

Figure 2:
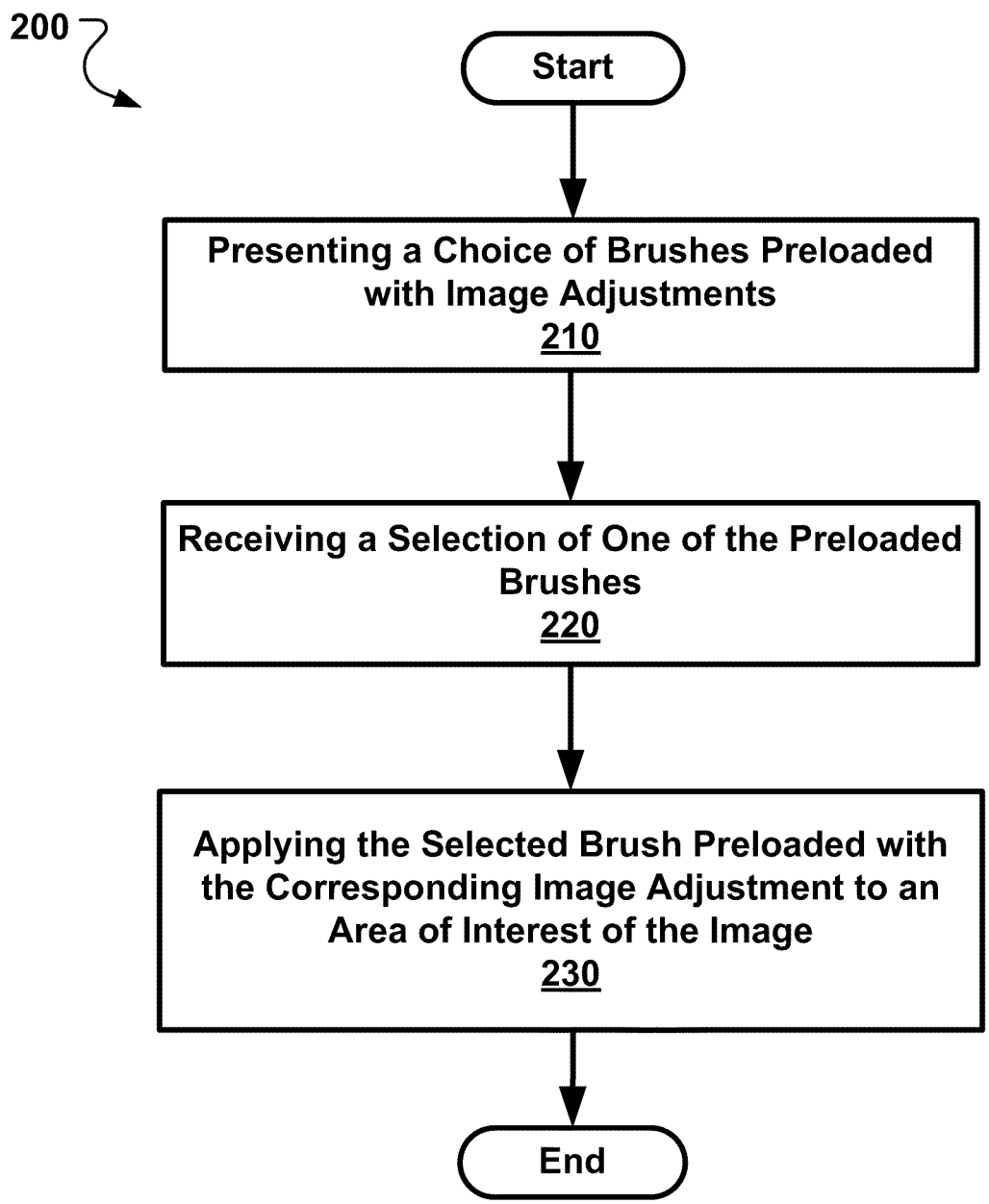
FIG. 2 is a process flow diagram showing a process (200) for implementing a pre-loaded brush tool.

FIG. 2 is a process flow diagram showing a process (200) for implementing a pre-loaded brush tool. A system or apparatus can implement a GUI to present a choice of brushes preloaded with different image adjustments (210). The system can receive user selection of one or more of the preloaded brushes (220). The system can apply the user selected image adjustment(s) using the pre-loaded brush (230).

In some implementations, the user can create a custom quick brush by pre-loading a desired image adjustment to a brush and saving the custom quick brush. Such custom quick brushes can allow the user to save a specific image adjustment for later use.

Brush Control

When applying an image adjustment to a target area(s) of interest using the brush-in tool, brush-away tool or quick brushes, the system can provide brush control assistance to facilitate brushing of the target area(s) of interest. For example, the system can present a choice of brush controls including brush size, brush softness and brush strength. Also, a brushing technique, such as feathering can be implemented to smear the brush mask to provide a smoother appearance. These brush controls can affect each brush stroke with respect to pixels covered and strength of image adjustment applied to the pixels. A brush stroke represents a path of the brush that covers an area or pixels of the image for a single application of the brush.

In addition, brush controls can be provided to assist brushing within a boundary of the target area(s) of interest. For example, the system can provide a brush control based on edge detection. Edge detection or edge aware can be implemented to assist brushing of pixels within the boundary of the target area(s) by detecting the edges of the image. Also, each brush stroke can be controlled based on tonal information such as highlights, midtones or shadows. For example, when the user desires to darken the bright area (e.g., the sky but not the trees in a field) in an image, highlights can be used to automatically darken the bright area(s) only.

Such brush control mechanisms (edge aware and tonality detection) can be implemented per-brush-stroke. Thus, the user can elect to use shadows for one brush stroke, midtones for the next brush stroke and highlights for the third brush stroke. Such, per-brush-stroke control affects the future brush strokes without changing the already applied brush strokes. For example, in the three brush-stroke example above, the selection of midtones affects the second brush stroke without changing the first brush stroke. Also, the selection of highlights for the third brush stroke does not affect the first two brush strokes.

Overlay

Figure 3A:
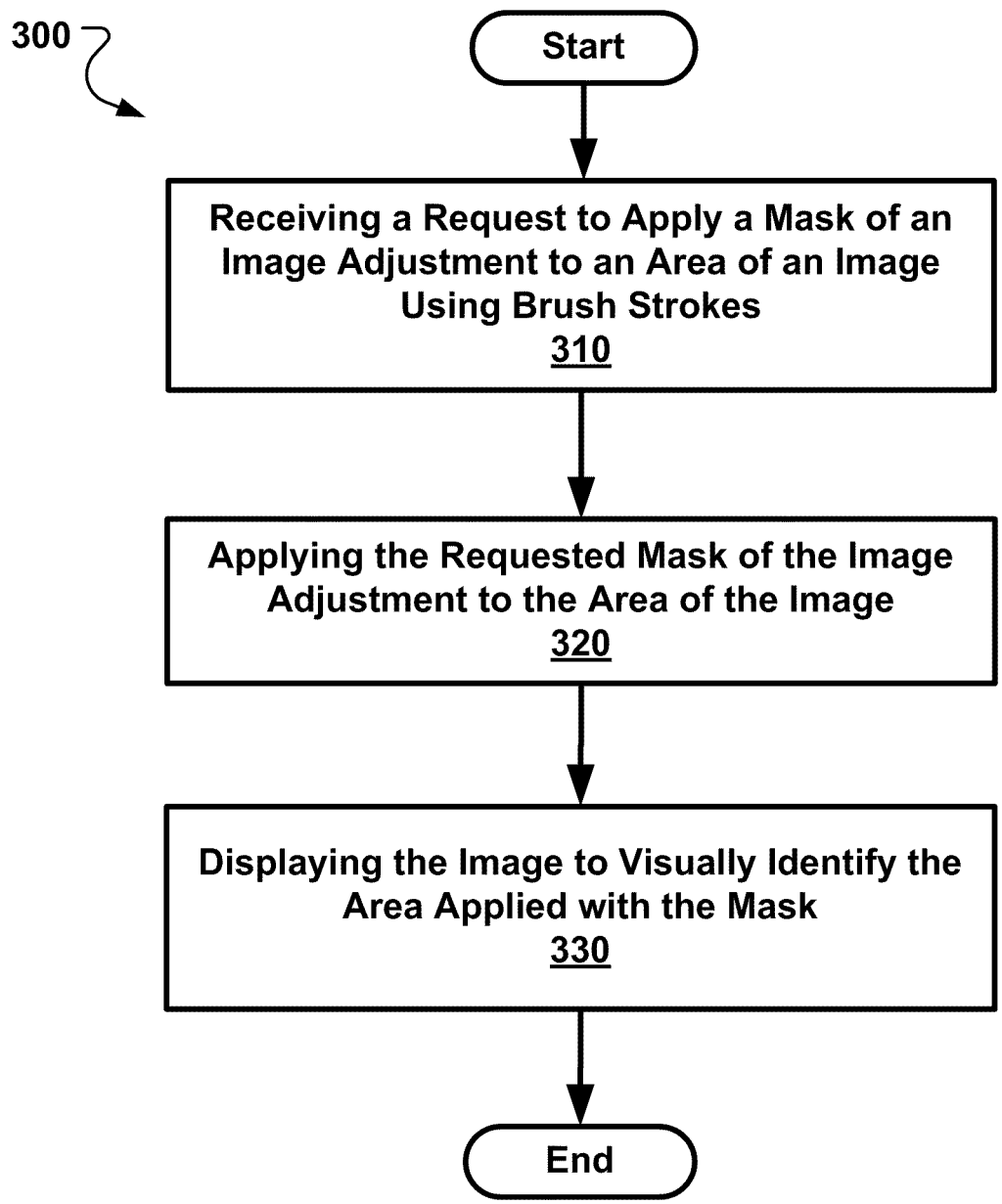
FIGS. 3A and 3B show process flow diagrams showing a process for presenting a visual indication of the applied image adjustment.
Figure 3B:
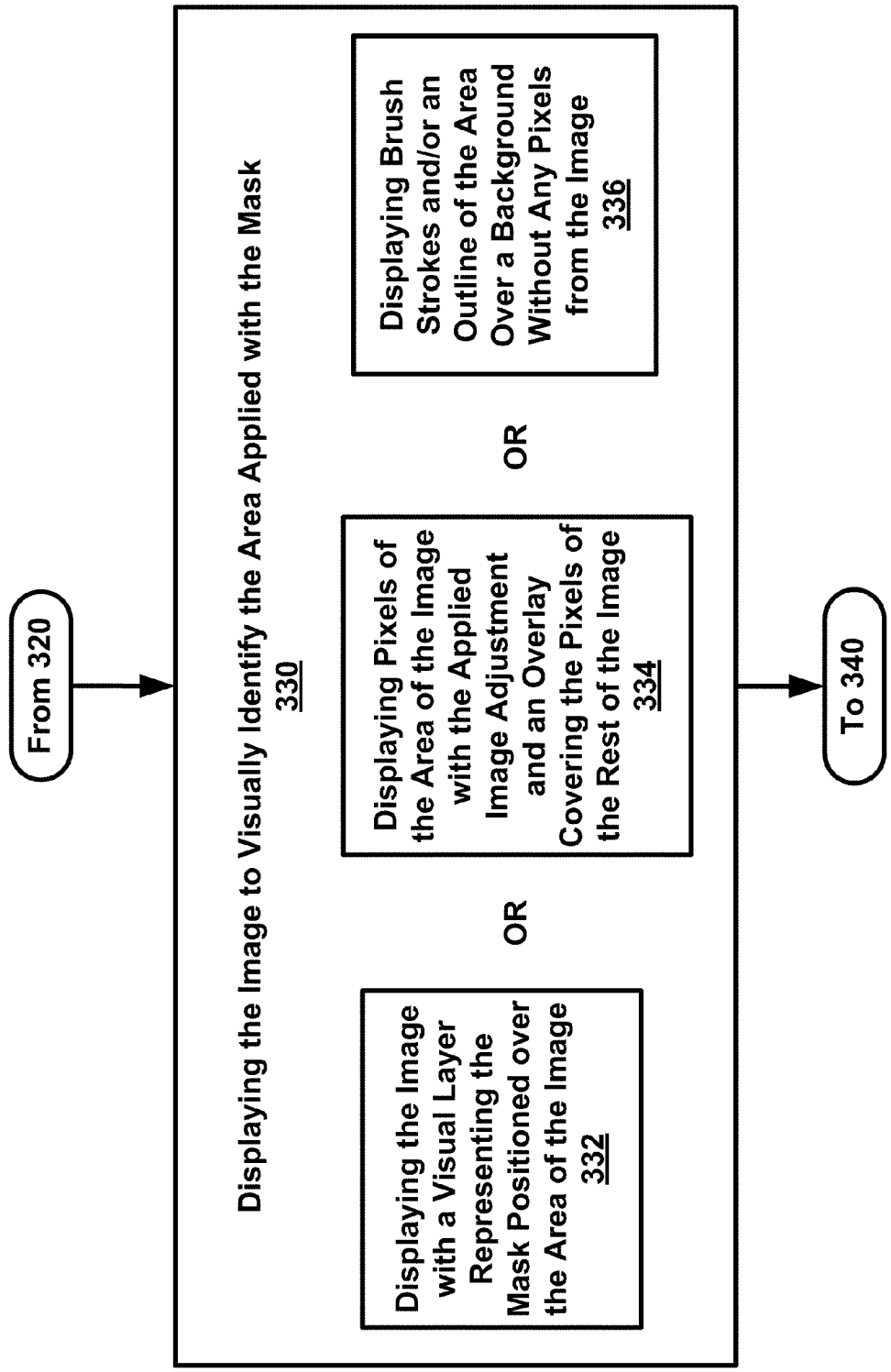

Once the selected image adjustments are applied to the area of interest on the image, the system can implement a GUI to provide a visual indication of the applied image adjustment. FIGS. 3A and 3B show process flow diagrams showing a process (300) for presenting a visual indication of the applied image adjustment. A system or an apparatus can implement a GUI to receiving a request to apply an image adjustment, using a brush mask for example, to an area of interest on an image using one or more brush strokes (310). The system can apply the requested image adjustment to the area of interest on the image (320). The system can display the image to visually identify the area of interest affected by the applied image adjustment (330).

Figure 4:
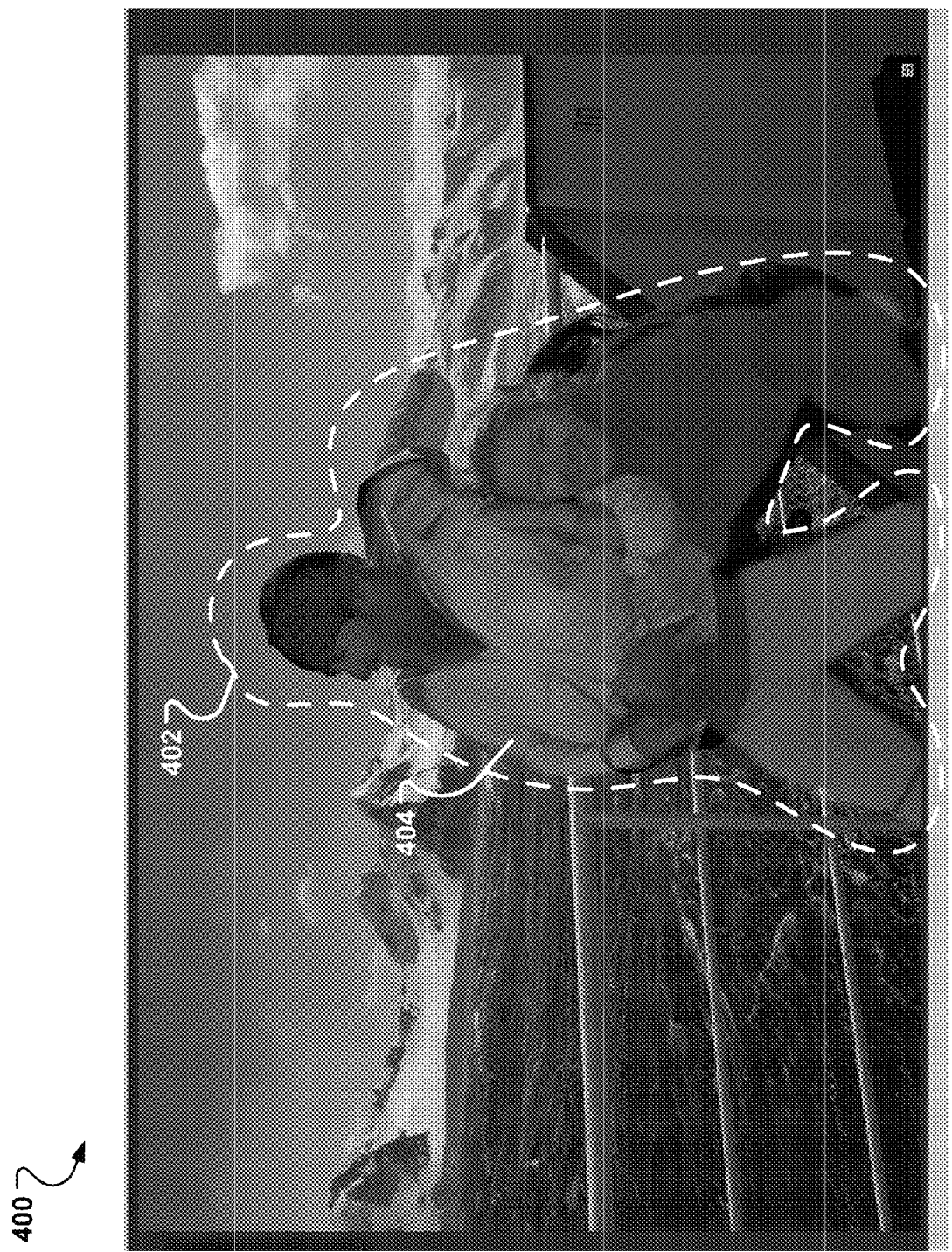
FIG. 4 below is a screen shot of a GUI that illustrates an example overlay.

In displaying the image to visually identify the area of interest affected by the applied image adjustment, different overlays can be implemented. For example, the system can display the image with a visual layer (e.g., an overlay) representing the image adjustment (e.g., brush mask) positioned over the affected area of interest on the Image (332). FIG. 4 below is a screen shot of a GUI that illustrates this overlay.

Figure 5:
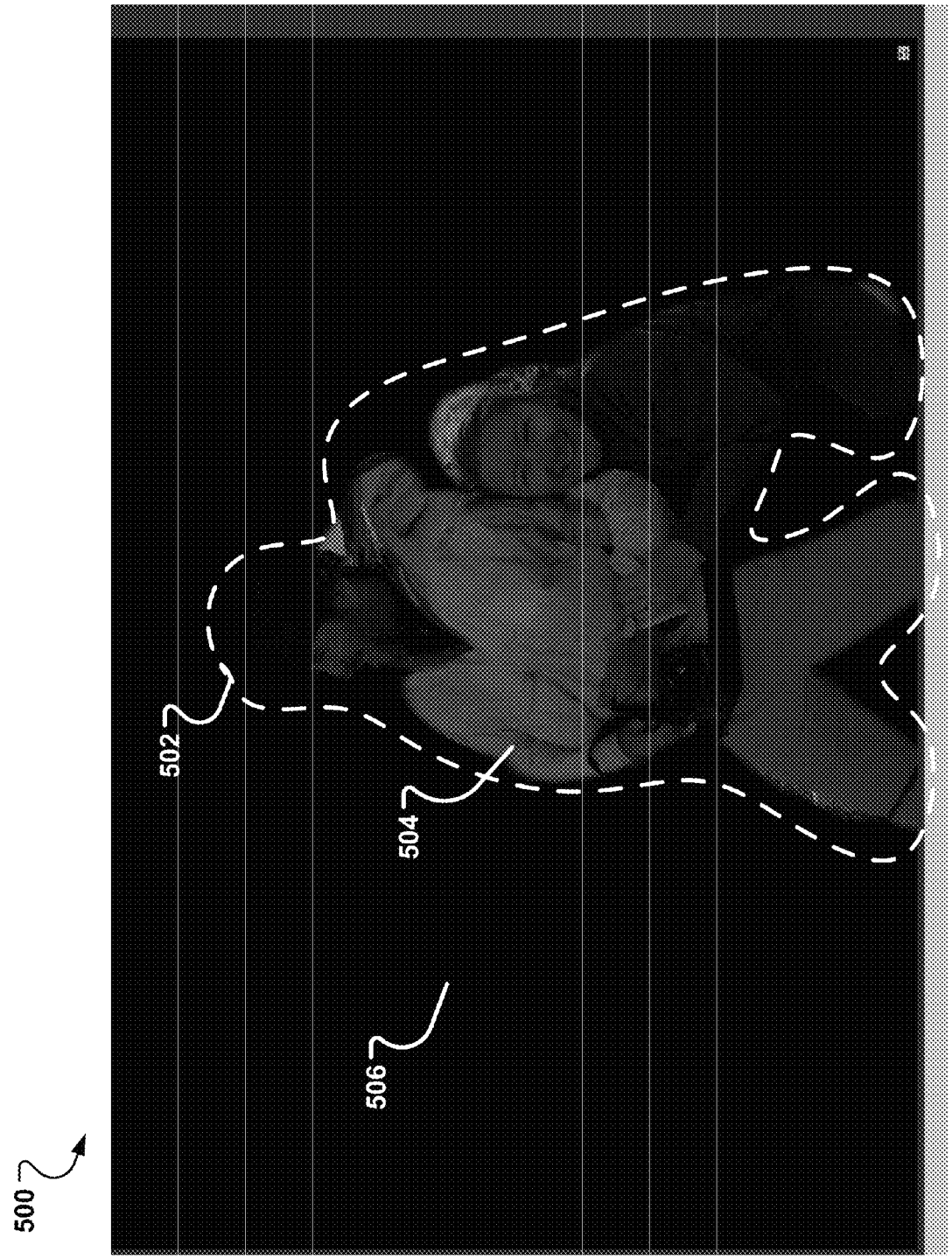
FIG. 5 below is a screen shot of a GUI that illustrate displaying pixels of the image affected by the image adjustment.

Also, the system can display the pixels of the area of interest with the applied image adjustment and an overlay over the pixels of the rest of the image (334). The overlay displayed over the rest of the image can effectively block the pixels outside the affected area of interest. The blocking overlay can be a single color, such as black or white to visually cover-up or block the remaining areas of the image. In this manner, the area of interest with the applied image adjustment can be easily viewed by the user. FIG. 5 below is a screen shot of a GUI that illustrates this blocking overly.

Figure 6:
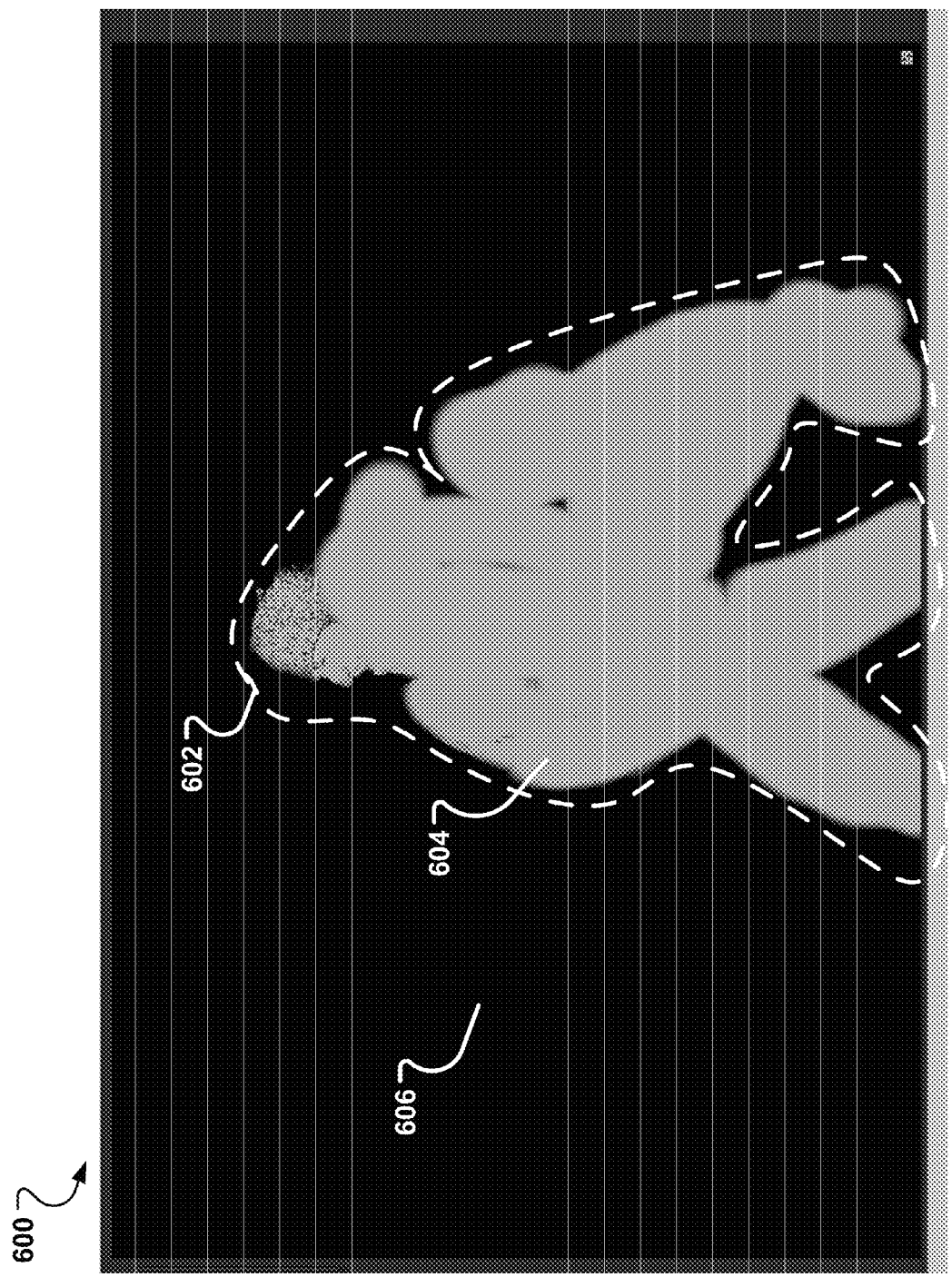
FIG. 6 is a screenshot showing the brush strokes of the image adjustment.

In addition, the system can display an overlay that represents the actual brush strokes of the image adjustment and/or an outline of the area of interest (336). This brush stroke overlay can block all of the pixels on the image so that none of the actual pixel information is visible to the user. A background color such as black or white can be used to cover the entire image using the brush stroke overlay. FIG. 6 below is a screen shot of a GUI that illustrates this brush stroke overly.

Graphical User Interface & Display for Overlays

FIGS. 4, 5 and 6 are screenshots of a GUI that shows different examples of overlays that can be used to identify the applied image adjustment. For example, FIG. 4 shows a screenshot (400) of an image of a man and a woman over a background. The image includes an area of interest (402) that includes the pixels covering the man and the woman. The dotted lines are not part of the image but rather used to illustrate a border around the area of interest (402). A selected image adjustment has been applied to the area of interest (402). The applied image adjustment is identified using an overlay (404) displayed over the area of interest (402). The overlay (404) can indicates the areas on the image in which the image adjustment was applied. For example, a colored (e.g., red) overlay can be displayed to show the areas on the image that were painted. The overlay can be transparent or translucent to show the pixels below the overlay.

FIG. 5 shows a screenshot (500) of an image of a man and a woman over a background. The screenshot (500) in FIG. 5 shows the same image as the one shown in FIG. 4. However, in this screenshot (500), the actual pixel information with the applied image adjustment (504) is displayed for the painted area of interest (502). The dotted lines are not part of the image but rather used to illustrate a border around the area of interest (502). The pixels for the areas outside the area of interest (502) are covered-up by a blocking overlay (506). The blocking overlay (506) can be a layer of any color, such as black, white, grey, etc. to hide the actual pixels of the image below the blocking layer.

FIG. 6 is a screenshot (600) of an image of a man and a woman over a background. The screenshot (600) shows the same image as shown in FIGS. 4 and 5. However, in this screenshot (600), an overlay (604) that shows the actual brush strokes and/or an outline of an area of interest (602) is displayed. The dotted lines are not part of the image but rather used to illustrate a border around the area of interest (602). The pixel information below the brush stroke overlay (604) is not visible to the user. Also, the rest of the image is covered by a blocking overlay (606), similar to the one shown in FIG. 5. In this implementation, none of the pixels of the image is displayed. Rather, the brush stroke overlay is displayed to show the brush strokes used to apply the image adjustment to the area of interest (602).

Brush Cursor Representation

When applying the image adjustments using the brush tools described in this specification, the location and appearance of a brush can be displayed using a cursor that represents the areas that will be brushed. The brush cursor can be represented using an inner circle surrounded by an outer circle or a ring. The inner circle can be displayed as a solid circle that represents the maximum strength of a particular adjustment. The outer circle can be displayed as a gradient that decreases from the edge of the inner circle to the edge of the outer circle. The image pixels positioned outside the outer circle are not affected by the brush. In some implementations, both the inner and outer circles can be displayed as solid circles to provide maximum strength adjustment for the entire cursor area.

Graphical User Interface for Brush Control and Adjustment

Figure 7:
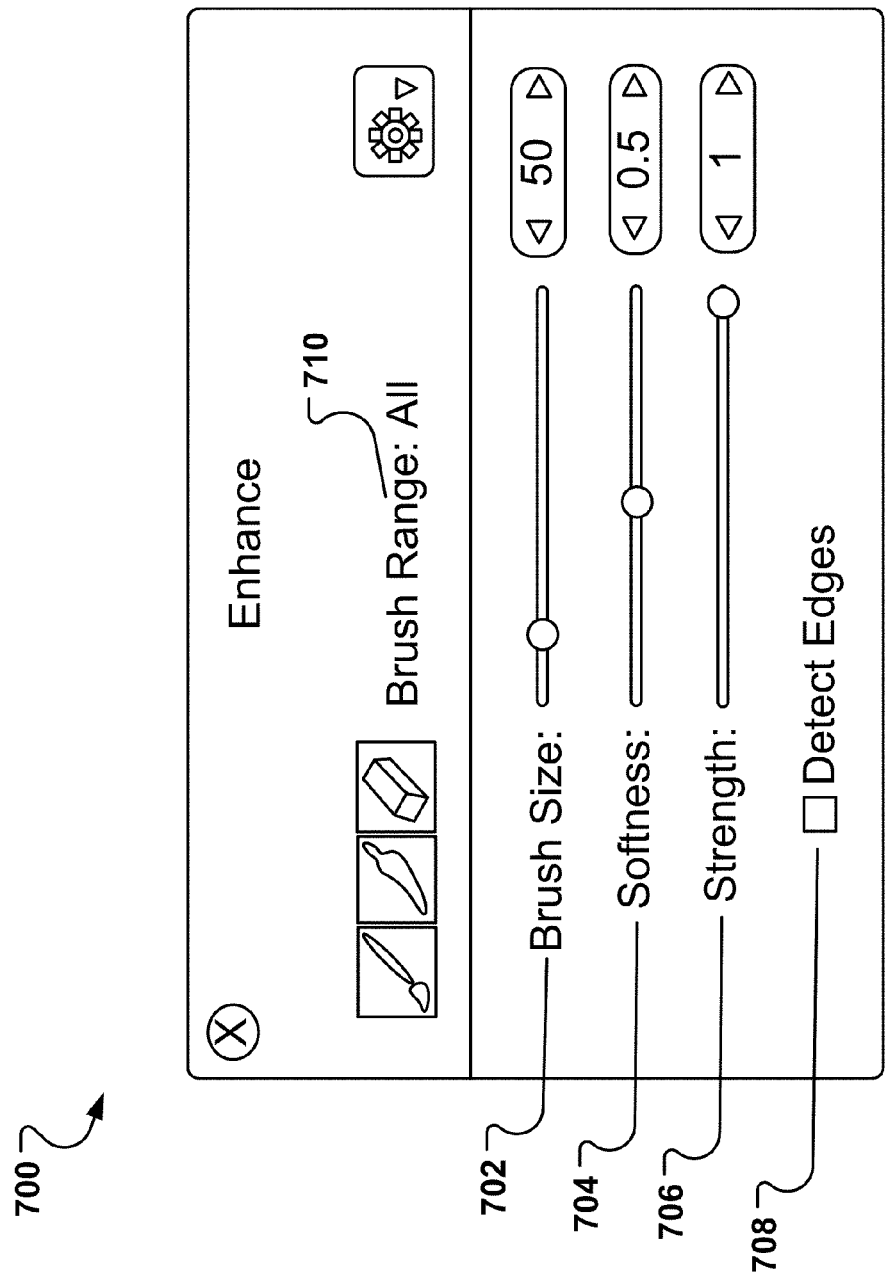
FIG. 7 shows a GUI that can be used to adjust available brush parameters for a selected image adjustment.

Various GUIs can be presented to the user to receive user input that selects and/or modifies different image adjustments and brush parameters. For example, FIG. 7 shows a GUI (700) that can be used to adjust available brush parameters for a selected image adjustment. The GUI (700) is associated with an enhance image adjustment. The GUI (700) can include user interface elements or widgets (e.g., sliders) to adjust the brush size (702), brush strength (704) and brush softness (706). Also, the GUI can include a widget to control the brush range based on edge detection (708). Edge detection allows a user to automatically brush an image adjustment within the line borders of an area of interest. Also, shadows, midtones, and highlights can be used to vary the brush range (710) based on tonal information.

Figure 8:
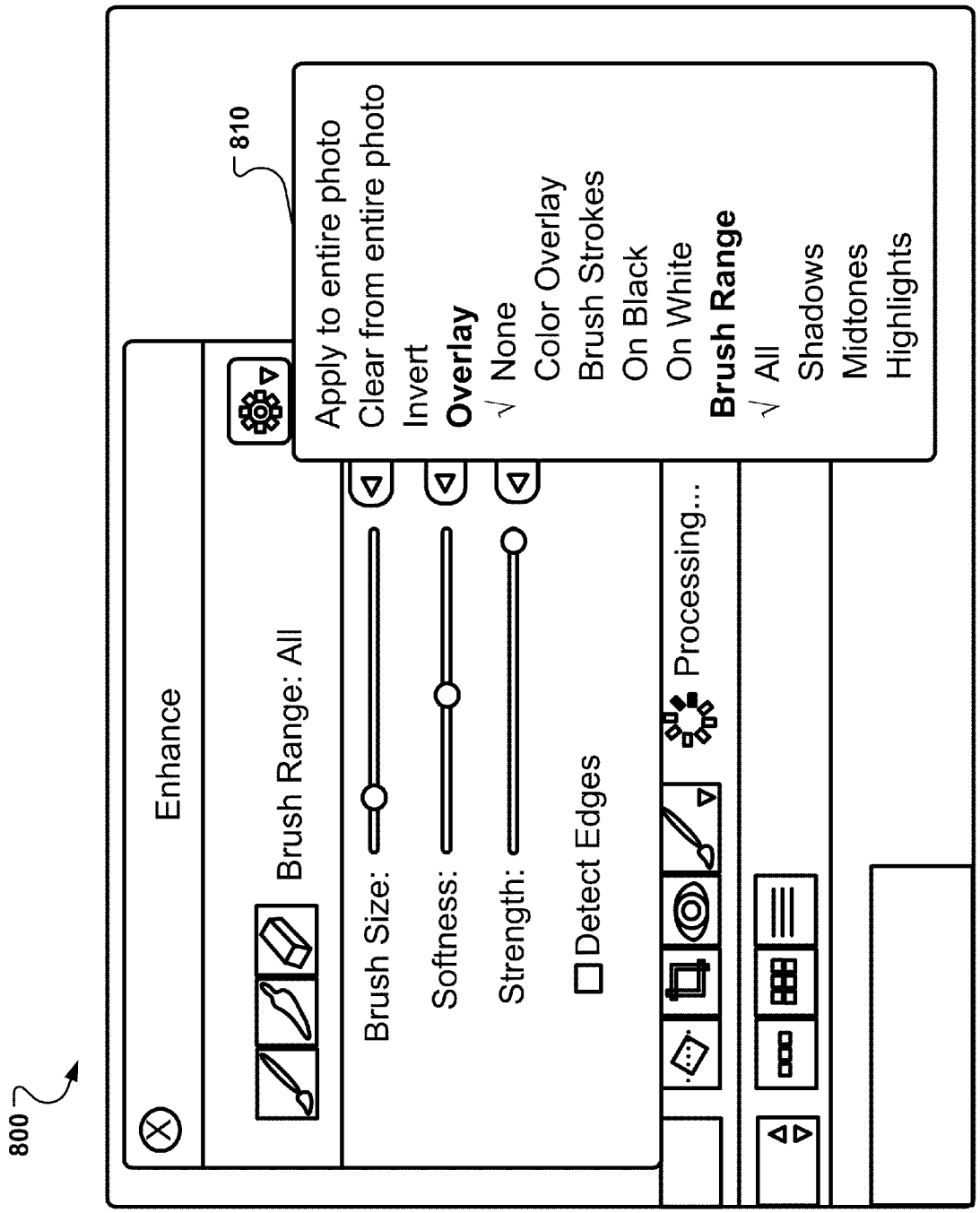
FIG. 8 shows another GUI (800) that can be used to adjust additional brush parameters.

FIG. 8 shows another GUI (800) that can be used to adjust additional brush parameters. In addition to the sliders shown in FIG. 7, the GUI (800) in FIG. 8 includes a menu (810) widget for presenting brush parameter options. The menu (810) widget can include options for applying an image adjustment to different areas of an image. For example, a menu option to "apply to entire photo" can be used to apply the image adjustment to the entire image. Another menu option to "clear from entire photo" can be used to remove the image adjustment from the entire image. Also, a menu option to "invert" can be used to invert the area interest from the current selection to all areas outside of the current selection. For example, if a man in an image is currently selected as the area of interest, the invert option can be used to invert the area of interest to the areas of the image other than the man.

The menu (810) widget can include options to adjust the overlay as described with respect to FIGS. 3A, 3B, 4, 5 and 6. The available overlay options can include: none, color overlay, brush strokes, on black, and on white. Also, the menu (810) widget can include options to adjust the brush range. The available options for the brush range can include: all, shadows, midtones and highlights. As described above, shadows, midtones and highlights use the tonal information of the image to apply brush control.

Figure 9:
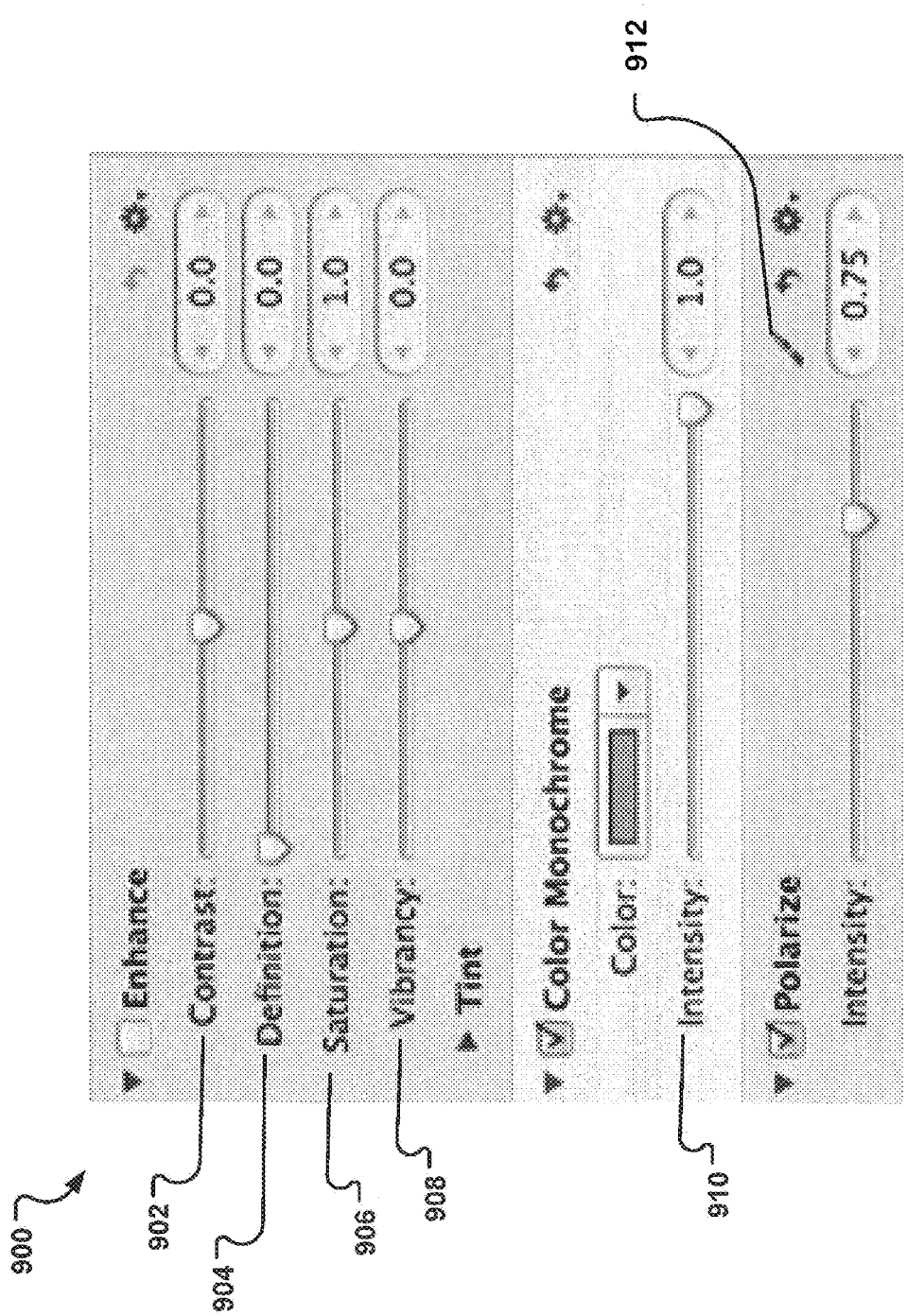
FIG. 9 shows a GUI that can be presented to select and modify different image filters.

In addition, GUIs can be presented to select and modify different image filters for a given image adjustment. For example, FIG. 9 shows a GUI (900) that can be used to select and modify the values for different image enhancement filters. The GUI (900) can include widgets, such as sliders, to modify the amount of contrast (902), definition (904), saturation (906) and vibrancy (908) applied in the filter. Also, the GUI (900) can include a widget to select and adjust different the color settings including the color intensity (910). The GUI (900) can include a brush icon widget (912) that visually indicates to the user that the user has brushed the image. Also, the brush icon can be used to bring back the brushing tool.

Figure 10:
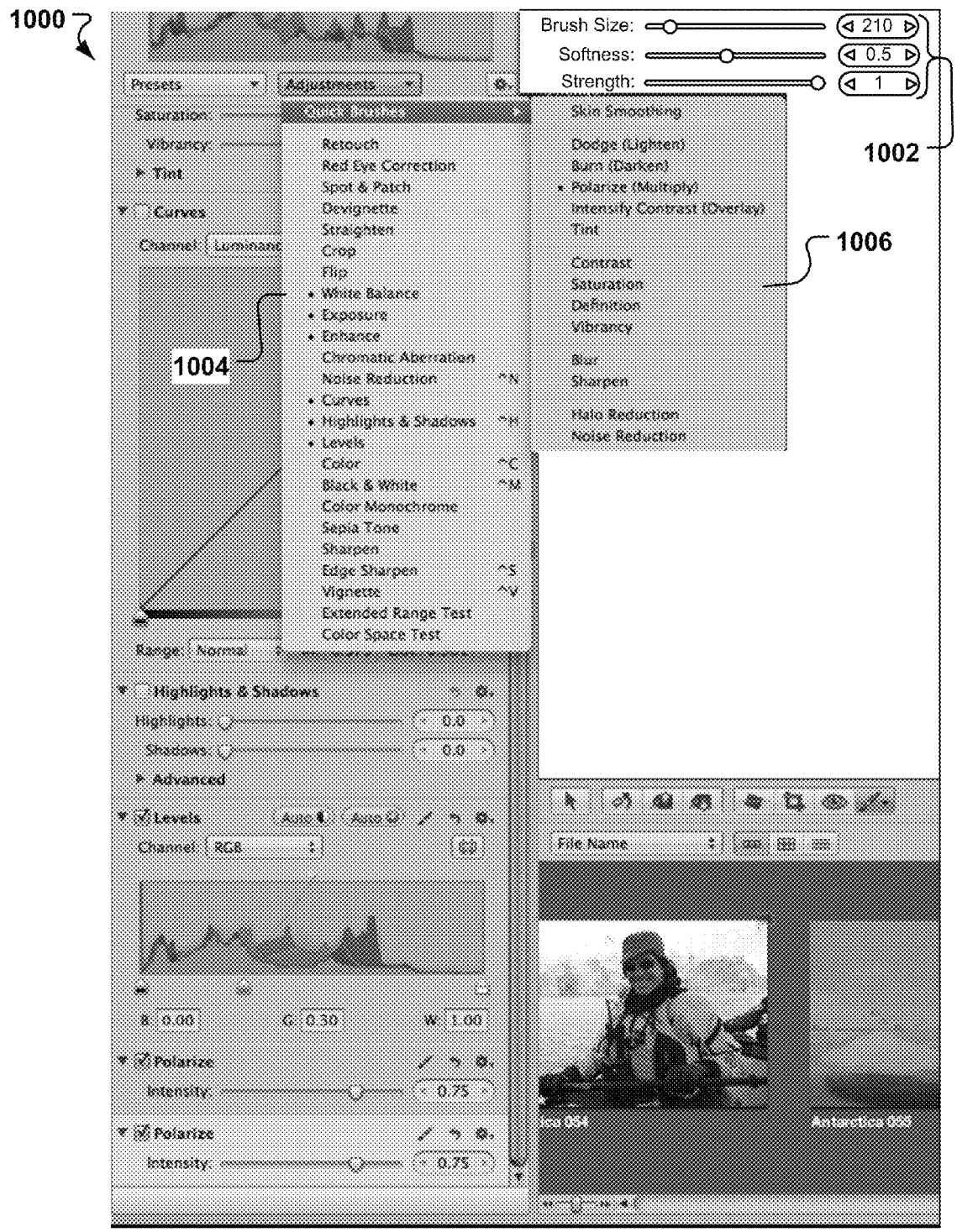
FIG. 10 shows another GUI that can be used to select and/or modify different adjustments.

FIG. 10 shows another GUI (1000) that can be used to select and/or modify different adjustments. The GUI (1000) includes widgets, such as sliders, to modify the brush size, brush softness and brush strength (1002). In addition, the GUI (1000) includes a widget, such as a menu element, to present different adjustments (1004) including: quick brushes, retouch, red eye reduction, spot & patch, devignette, straighten, crop, flip, white balance, exposure, enhance, chromatic aberration, noise reduction, curves, highlight & shadows, levels, color, black & white, color monochrome, sepia tone, sharpen, edge sharpen, vignette, extended range test, and color space test. Also, a menu widget (1006) can be provided to present a list of different quick brushes, such as skin smoothing, dodge (lighten), burn (darken), polarize (multiply), intensify contrast (overlay), tint, contrast, saturation, definition, vibrancy, blur, sharpen, halo reduction, and noise reduction. A user can select multiple instances of the available adjustments and brush them into different parts of the image. For example, a user can choose to saturate one part of the image and de-saturate a different part of the image.

Removable (e.g., Non-Destructible) Adjustments

Each image adjustment can be implemented as a separate brush. Each brush is non-destructible or removable to allow the user to selectively apply or remove the corresponding image adjustment to specific areas of an image with precise control over brush size, strength and softness. Because the brush is non-destructive, applied effects can be modified at any time.

In implementing the non-destructive brushes, applied image adjustments are represented as separate fields in a record or data structure. The record or data structure containing the adjustment information is used to apply a brush mask over the image. Thus, the adjustments applied using the non-destructive brushes do not directly modify the image values, e.g. pixels.

Figure 11:
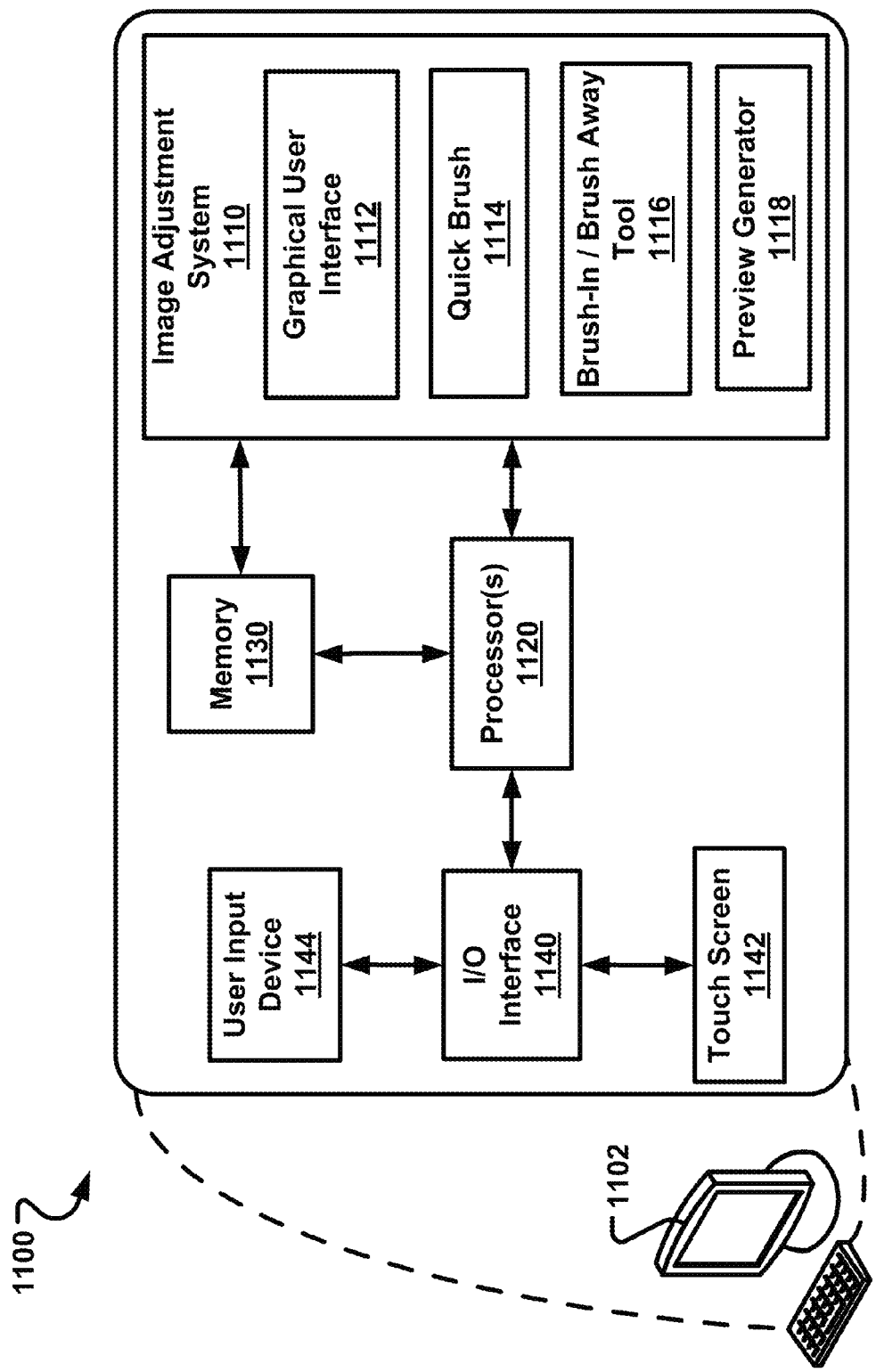
FIG. 11 is a block diagram of a data processing device and system that can be used to implement the techniques described with respect to FIGS. 1A-1C, 2, 3A-3B and 4-10.

FIG. 11 is a block diagram of a data processing device and system (1100) that can be used to implement the techniques described with respect to FIGS. 1A-1C, 2, 3A-3B and 4-11. The system (1100) can include a processor (1120) to control operation of the system (1100) including executing any machine or computer readable instructions. The processor (1120) can communicate with a memory or data storage unit (1130) that can store data, such as image files and machine or computer readable instructions. Also, the processor (1120) can communicate with an image management system (1110) to manage different image files including import, export, storage, image adjustment, metadata application and display of the image files. The image management system (1110) can include a graphical user interface (1112), for example, the graphical user interface described above with reference to FIG. 1A. The image management system (1110) can include a quick brush 1114, for example, the quick brush tool described above. The image management system (1110) can include a brush-in/brush-away tool (1116), for example, the brush-in tool, brush-away tool described above. The image management system (1110) can include a preview generator (1118), for example, to generate the preview described above with reference to FIGS. 1A-1C. The processor (1120) can communicate with an input/output (I/O) interface (1140) that can interface with different input devices, output devices or both. For example, the I/O interface (1140) can interface with a touch screen (1142) on a display device (1102). Also, the I/O interface (1140) can interface with a user input device (1144) such as a keyboard, a mouse, a trackball, etc. that are designed to receive input form a user.

Figure 12:
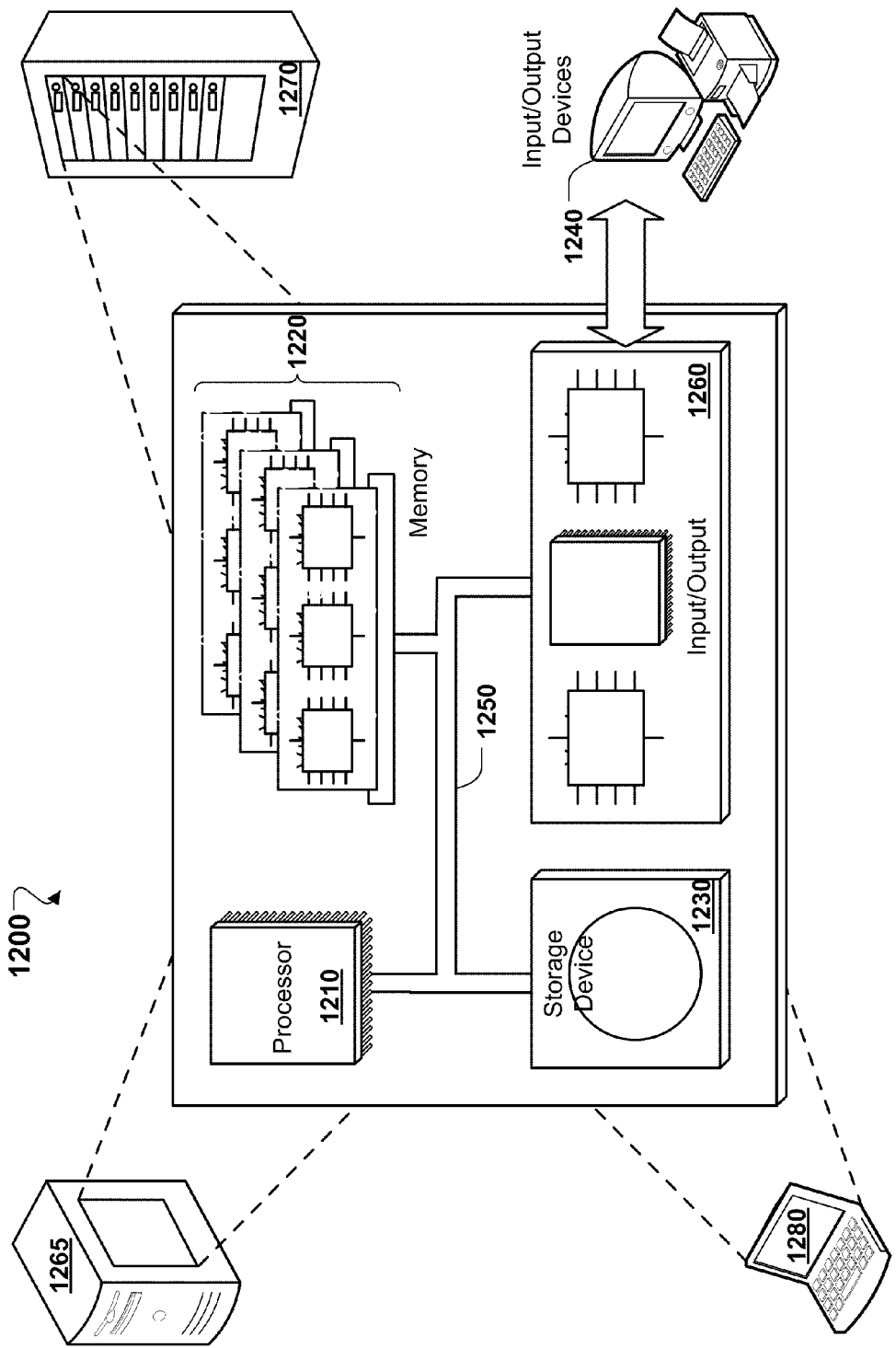
FIG. 12 is a block diagram of another data processing device and system that can be used implement the techniques as described with respect to FIGS. 1A-1C, 2, 3A-3B and 4-10.

FIG. 12 is a block diagram of another data processing device and system that can be used implement the techniques as described with respect to FIGS. 1A-1C, 2, 3A-3B and 4-11. Data processing device 1200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Data processing device 1200 includes a processor 1210, memory 1220, a storage device 1230, a high-speed interface 1250 connecting to memory 1220. The data processing device can also include high-speed expansion ports (not shown), and a low speed interface (not shown) connecting to low speed bus (not shown) and storage device 1230. Each of the components 1210, 1220, 1230, 1250, and 1220, are interconnected using various busses, and can be mounted on a common motherboard or in other manners as appropriate. The processor 1210 can process instructions for execution within the data processing device 1200, including instructions stored in the memory 1220 or on the storage device 1230 to display graphical information for a GUI on an external input/output device, such as display 1240 coupled to an input/output interface 1260. In other implementations, multiple processors and/or multiple buses can be used, as appropriate, along with multiple memories and types of memory. Also, multiple data processing devices 1200 can be connected, with each device providing portions of the necessary operations (e.g., as a server bank, a group of blade servers, or a multi-processor system).

The memory 1220 stores information within the data processing device 1200. In one implementation, the memory 1220 is a computer-readable medium. In one implementation, the memory 1220 is a volatile memory unit or units. In another implementation, the memory 1220 is a non-volatile memory unit or units.

The storage device 1230 is capable of providing mass storage for the data processing device 1200. In one implementation, the storage device 1230 is a computer-readable medium. In various different implementations, the storage device 1230 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 1220, the storage device 1230, memory on processor 1210, or a propagated signal.

The high speed controller 1250 manages bandwidth-intensive operations for the data processing device 1200, while the low speed controller manages lower bandwidth-intensive operations. Such allocation of duties is exemplary only. In one implementation, the high-speed controller 1250 is coupled to memory 1220, display 1240 (e.g., through a graphics processor or accelerator), and to high-speed expansion ports (not shown), which can accept various expansion cards (not shown). In the implementation, low-speed controller (not shown) is coupled to storage device 1230 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The data processing device 1200 can be implemented in a number of different forms, as shown in the figure. For example, it can be implemented as a standard server 1265, or multiple times in a group of such servers. It can also be implemented as part of a rack server system 1270. In addition, it can be implemented in a personal computer such as a laptop computer 1280.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. For example, the image adjustments can be applied to the images using a brush mask.

What is claimed is:

1. A method comprising:
    presenting a choice of image adjustments to a user of a data processing device;
    receiving, at the data processing device, a user selection from among the choice of image adjustments of at least one image adjustment that a user desires to apply to an area of interest of the image;
    applying, at the data processing device, the user selected image adjustment to an entirety of an image;
    displaying, at the data processing device, a preview of the user selected image adjustment applied to the entirety of the image;
    receiving, at the data processing device, user input comprising application of the user selected image adjustment to the area of interest using a brushing application;
    in response to receiving the user input:
        detecting, at the data processing device, an edge of the area of interest of the image;
        applying, at the data processing device, the user selected image adjustment within the edge of the area of interest of the image; and
        removing, at the data processing device, the image adjustments from a remainder of the image.

2. The method of claim 1, wherein the selected brushing application comprises a brush-in application configured to apply the user selected image adjustment to the area of interest of the image, comprising:
    removing the applied image adjustment from the entirety of the image to restore the image to a pre-adjustment state;
    loading a brush with the selected image adjustment; and
    applying the user selected image adjustment onto the area of interest based on the user input that comprises an indication of a brush stroke.

3. The method of claim 1, wherein the selected brushing application comprises a brush-away application configured to remove the selected image adjustment from the image, comprising:
    using a brush to remove the applied image adjustment from the image except for the area of interest of the image based on the user input that comprises an indication of a brush stroke.

4. The method of claim 1, wherein applying the user selected image adjustment comprises applying a brush mask over the area of interest of the image.

5. The method of claim 1, wherein the choice of image adjustments comprises at least one of skin smoothing, blurring, saturation, color, lighten or darken, devignette, white balance, exposure, enhance, chromatic aberration, noise reduction, curves, highlight and shadows, black and white, color monochrome, sepia tone, sharpen, edge sharpen and vignette.

6. The method of claim 1, wherein, detecting an edge of the area of interest of the image comprises:

detecting a boundary of the area of interest;
determining that the application of the user selected image adjustment to the area of interest using the brushing application falls outside the boundary of the area of interest; and
retaining the application of the brushing application to within the boundary of the area of interest.

7. The method of claim 1, comprising:
identifying one or more areas of shadows, midtones or highlights on the image; and
controlling application of the user selected image adjustment based on the identified areas of shadows, midtones or highlights per brush stroke.

8. The method of claim 1, comprising:
receiving user modification of a strength of the user selected image adjustment.

9. A method comprising:
presenting a plurality of image adjustments at a data processing device;
receiving, at the data processing device, a first request to apply an image adjustment of the plurality of image adjustments to an entirety of an image;
in response to receiving the first request, applying, at the data processing device, the image adjustment to the entirety of the image;
receiving, at the data processing device, a selection of a brush tool to apply image adjustments to the image;
receiving, at the data processing device, a second request to apply the image adjustment to an area of the image using one or more brush strokes of the brush tool;
in response to receiving the second request:
    detecting, at the data processing device, an edge of the area of the image;
    applying, at the data processing device, the requested image adjustment to the area of the image according to the one or more brush strokes; and
    removing, at the data processing device, the image adjustments from a remainder of the image to restore the image to a pre-image adjustment state.

10. The method of claim 9, further comprising displaying, at the data processing device, a visual indication identifying the area of the image applied with the image adjustment, wherein the visual indication comprises an overlay representing the applied image adjustment positioned over the area of the image.

11. The method of claim 10, wherein the overlay comprises a colored layer.

12. The method of claim 10, wherein, displaying the visual indication comprises displaying pixels of the area of the image applied with the image adjustment without displaying pixels of a remainder of the image.

13. The method of claim 10, wherein displaying the visual indication comprises displaying an overlay representing one or more brush strokes corresponding to the applied image adjustment without displaying any pixels of the image.

14. An apparatus comprising:
an image adjustment system configured to apply an image adjustment to a target area of an image, wherein the image adjustment system comprises a graphical user interface to present available image adjustments and brushing tools;
a display unit in communication with the image adjustment system, wherein the display unit is configured to display the graphical user interface to present the available image adjustments and brushing tools to a user; and
a user input unit to communicate with the image adjustment system and the display unit, wherein the user input unit is configured to receive a user selection of at least one of the available image adjustments and at least one of the available brushing tools;
wherein:
the display unit is configured to present a choice of image adjustments;
the user input unit is configured to receive a user selection from among the choice of image adjustments of an image adjustment that a user desires to apply to an area of interest of the image;
the image adjustment system is configured to apply the user selected image adjustment to an entirety of the image,
the display unit is configured to display a preview of the user selected image adjustment applied to the entirety of the image,
the user input unit is configured to receive user input comprising application of the user selected image adjustment to the target area using a brushing tool,
in response to the user input unit receiving the user input:
    the image adjustment system configured to:
        detect an edge of the target area;
        apply the user selected image adjustment within the edge of the target area of the image; and
        remove the user selected image adjustment from a remainder of the image.

15. The apparatus of claim 14, wherein the available brushing tools comprise a brush-in tool configured to
remove the applied image adjustment from the entirety of the image; and
apply the user selected image adjustment to the target area of the image without affecting a remainder of the image.

16. The apparatus of claim 14, wherein the available brushing tools comprise a brush-away tool to remove the user selected image adjustment from areas of the image other than the target area.

17. The apparatus of claim 14, wherein the display unit is configured to visually indicate the target area of the image applied with the selected image adjustment.

18. The apparatus of claim 14, wherein the image adjustment system comprises a preview unit in communication with the display unit, the preview unit configured to render a preview of the selected image adjustment to the entire image and send the rendered preview to the display unit to be displayed to a user.

19. The apparatus of claim 14, wherein the graphical user interface comprises a user interface widget configured to modify the strength of the user selected image adjustment.

20. A non-transitory computer-readable medium embodying instructions when executed by a processor causes a data processing device to perform operations comprising:
presenting a choice of image adjustments;
receiving a selection of an image adjustment from among the choice of image adjustments;
applying the selected image adjustment to an entirety of the image;
displaying a preview of the image including the selected image adjustment applied to the entirety of the image;
receiving an input to apply the selected image adjustment to an area of interest of the image;
in response to receiving the input:
    detecting an edge of the area of interest of the image;
    applying the selected image adjustment within the edge of the area of interest of the image;
    removing the selected image adjustment from a remainder of the image.

21. The medium of claim 20, wherein the input to apply the selected image adjustment to an area of interest of the image comprises an input to a brushing application which comprises a brush-in application configured to
- remove the applied image adjustment from the entirety of the image;
- load the user selected image adjustment to a brush; and
- apply the user selected image adjustment to the areas of interest using the brush.

22. The medium of claim 20, wherein the input to apply the selected image adjustment to an area of interest of the image comprises an input to a brushing application which comprises a brush-away application to remove the user selected image adjustment from areas of the image other than the area of interest.

23. A system comprising:
- a processor; and
- a computer-readable medium storing instructions executable by data processing apparatus to perform operations comprising:
  - presenting a plurality of image adjustments;
  - receiving a first request to apply an image adjustment of the plurality of image adjustments to an entirety of an image;
  - in response to receiving the first request, applying the image adjustment to the entirety of the image;
  - receiving a selection of a brush tool to apply image adjustments to the image;
  - receiving a second request to apply the image adjustment to an area of the image using one or more brush strokes of the brush tool;
  - in response to receiving the second request:
    - detecting an edge of the area of the image;
    - applying the requested image adjustment to the area of the image according to the one or more brush strokes;
    - removing, at the data processing device, the image adjustments from a remainder of the image to restore the image to a pre-image adjustment state.

24. The system of claim 23, the operations further comprising displaying, at the data processing device, a visual indication identifying the area of the image applied with the image adjustment.

25. The system of claim 24, wherein the visual indication comprises an overlay representing the applied image adjustment positioned over the area of the image.

26. The system of claim 25, wherein the overlay comprises a colored layer.

27. The system of claim 24, wherein, displaying the visual indication comprises displaying pixels of the area of the image applied with the image adjustment without displaying pixels of a remainder of the image.

28. The system of claim 24, wherein displaying the visual indication comprises displaying an overlay representing one or more brush strokes corresponding to the applied image adjustment without displaying any pixels of the image.

* * * * *

UNITED STATES PATENT AND TRADEMARK OFFICE
CERTIFICATE OF CORRECTION

PATENT NO. : 8,687,015 B2
APPLICATION NO. : 12/611001
DATED : April 1, 2014
INVENTOR(S) : Bhatt et al.

Page 1 of 1

It is certified that error appears in the above-identified patent and that said Letters Patent is hereby corrected as shown below:

On the Title Page

Item (75), should read:
Nikhil Bhatt, Cupertino, CA (US);
Mark Lee Kawano, San Mateo, CA (US);
Douglas Joseph Ahmann, Woodbury, MN (US)

Signed and Sealed this
Thirtieth Day of June, 2020

Andrei Iancu
*Director of the United States Patent and Trademark Office*